United States Patent [19]

Arakawa

[11] Patent Number: 4,646,062
[45] Date of Patent: Feb. 24, 1987

[54] KEY INPUT DEVICE
[75] Inventor: Kazuhiro Arakawa, Yamato, Japan
[73] Assignee: Canon Kabushiki Kaisha, Tokyo, Japan
[21] Appl. No.: 634,437
[22] Filed: Jul. 26, 1984
[30] Foreign Application Priority Data Aug. 2, 1983 [JP] Japan ................................. 58-142161

[51] Int. Cl.$^4$ ........................... G06F 3/02; G08C 1/00
[52] U.S. Cl. ......................... 340/365 R; 340/365 VL
[58] Field of Search ........ 340/365 R, 365 VL, 365 S, 340/365 E; 434/228; 364/709

[56] References Cited
U.S. PATENT DOCUMENTS 4,017,848  4/1977  Tannas ......................... 340/365 VL Primary Examiner—James L. Rowland
Assistant Examiner—T. Rittmaster
Attorney, Agent, or Firm—Fitzpatrick, Cella, Harper & Scinto

[57] ABSTRACT

A key input device is arranged such that a transparent keyboard is placed on a display unit for displaying characters and numerals so as to perform display and key input operations. Transparent electrodes are formed on the inner walls of a plurality of transparent sheets in the keyboard, and transparent projecting members as spacers are formed on one of the inner walls so as to prevent key input errors. The projecting members are constituted by transparent semispherical members formed on the inner wall of the transparent sheet disposed away from the light incident side, thereby improving readability of the displayed content on the display unit.

14 Claims, 6 Drawing Figures

KEY INPUT DEVICE

BACKGROUND OF THE INVENTION

1. Field of the Invention

The present invention relates to a key input device for visually observing display data displayed on a display unit through a keyboard.

2. Description of the Prior Art

In an input/output device having a transparent keyboard as an input device arranged on an upper surface of a display unit as an output device, the transparent keyboard as the input device has two transparent sheets spaced by a small distance apart from each other, transparent electrodes are formed on the opposing surfaces of the two transparent sheets, and a key input entered such that the upper transparent sheet is depressed by a finger so as to bring the opposing transparent electrodes into contact with each other. A display unit as the output device is arranged under the transparent keyboard. Characters and numerals displayed on the display unit under the transparent keyboard are observed while an operator enters desired information. However, when a spacer is not inserted between the two transparent sheets constituting the transparent keyboard, contact electrodes of the neighboring keys on the upper transparent sheet are brought into contact with the corresponding electrodes of the lower transparent sheet even if a given key is depressed. In other words, even if the operator enters a single key signal, a plurality of key signals are entered in practice, resulting in data entry errors. However, when the spacer is inserted between the two transparent sheets, it is difficult for the operator to read the characters and numerals displayed on the display unit, resulting in inconvenience.

SUMMARY OF THE INVENTION

It is a first object of the present invention to allow an operator to visually observe displayed contents on a display unit through a keyboard.

It is a second object of the present invention to prevent the operator from making a data entry error since dot spacers are inserted between two transparent sheets.

It is a third object of the present invention to improve readability of the displayed contents on the display unit by preventing light spots caused by a radiation light focusing behavior when the dot spacers comprise transparent members, respectively.

DESCRIPTION OF THE PREFERRED EMBODIMENTS

Preferred embodiments of the present invention will be described with reference to the accompanying drawings.

Figure 1:
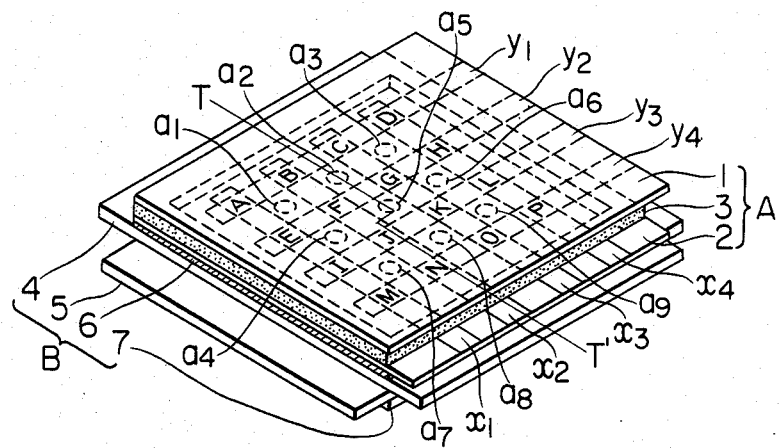
FIG. 1 is a perspective view of a liquid crystal display keyboard as a key input device according to the present invention.

FIG. 1 is a perspective view of a liquid crystal display keyboard having a key input device according to the present invention. Referring to FIG. 1, a first transparent sheet (plate member) 1 comprises an electrically insulating transparent member such as a polyester film. Transparent conductive electrodes $y_1$ to $y_4$ are formed by deposition or the like on the lower surface of the transparent sheet 1 so as to perform key input operation. A second transparent sheet (plate member) 2 is made of the same material as the first transparent sheet 1. The second transparent sheet 2 need not be flexible, so that it can be made of a glass sheet. Transparent conductive electrodes $x_1$ to $x_4$ are formed by deposition or the like on the upper surface of the second sheet 2 in a direction perpendicular to the transparent electrodes $y_1$ to $y_4$. Intersections between the electrodes $x_1$ to $x_4$ and the electrodes $y_1$ to $y_4$ serve as key switches. The first and second sheets 1 and 2 are adhered to the upper and lower surfaces of a frame spacer 3 so as to define a small space therebetween. Dot spacers $a_1$ to $a_9$ are made of transparent silicone rubber and are formed by silk screen printing or the like on the inner surface of one of the first and second transparent sheets 1 and 2. Since the dot spacers $a_1$ to $a_9$ are formed by silk screen printing or the like, they are respectively constituted by projection of a semispherical shape. When a diameter of the dot spacer is not more than 0.1 mm, displayed data on the display unit can be clearly observed. The above arrangement constitutes a keyboard A. A display unit B comprises a reflective type liquid crystal display. This liquid crystal display comprises an upper glass plate 4 having a transparent electrode pattern, a lower glass plate 5 having the same transparent electrode pattern as in the upper glass plate 4, an upper polarizing plate 6 formed on the upper surface of the upper glass plate 4, and a reflecting plate 7 with a polarizing plate. This reflecting plate 7 is formed on the lower surface of the lower glass plate 5.

In the liquid crystal display keyboard having the arrangement described above, data displayed on the display unit B can be visually observed by the operator through the keyboard A. When the operator depresses a desired point on the keyboard A, corresponding data can be entered. Since the dot spacers $a_1$ to $a_9$ are formed between the first and second transparent sheets 1 and 2 constituting the keyboard A, only the electrode at the desired point on the first transparent sheet 1 is brought into contact with that on the second transparent sheet 2, and the electrodes at neighboring points of the first transparent sheet 1 and 2 will not be brought into contact with those of the second transparent sheet 2.

Figure 2:
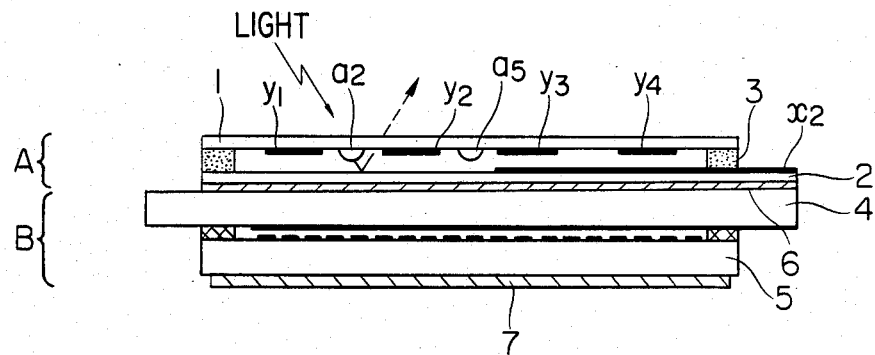
FIG. 2 is a sectional view of the liquid crystal display keyboard shown in FIG. 1.

FIG. 2 is a sectional view of the liquid crystal display keyboard in FIG. 1 taken along a line T - T' thereof. The display unit B comprises a reflective type liquid crystal display, and the dot spacers $a_1$ to $a_9$ are formed on the lower surface of the first transparent sheet included in the keyboard A. In this case, since the display unit B comprises a reflective type liquid crystal display, illuminating light is incident through the upper surface of the keyboard A, so that the operator can easily read the displayed data on the liquid crystal display. However, the dot spacers $a_1$ to $a_9$ have a spherical shape and a focusing function. As a result, light spots are formed on the surface of the liquid crystal display to partially emphasize brightness of the display screen, resulting in poor readability.

Figure 3:
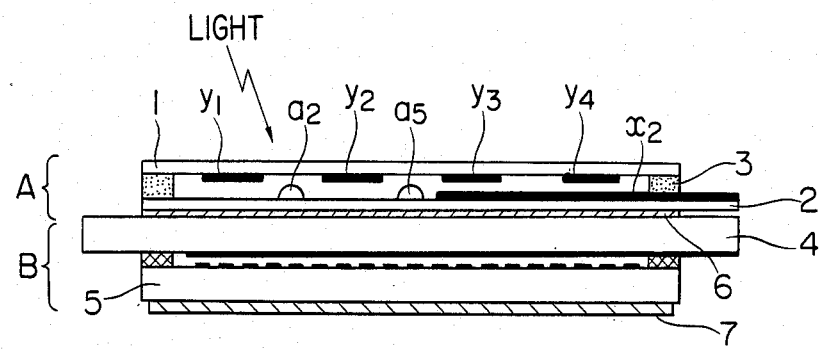
FIG. 3 is a sectional view of a liquid crystal display keyboard when a reflective type liquid crystal display is used as a display unit B.

Referring to FIG. 3, the dot spacers are formed on the upper surface (inner wall) of the second transparent sheet 2 which is further away from a light source than the lower surface (inner wall) of the first transparent sheet 1 so as to prevent the focusing function of the dot spacers $a_1$ to $a_9$ shown in FIG. 2. In this construction, the convex surfaces of the dot spacers $a_1$ to $a_9$ are directed toward the light incident side, thereby decreasing the focusing function. As a result, the data displayed on the liquid crystal display can be clearly observed. In addition, even if focusing by the dot spacers is only slightly performed, the light is focused at a deeper position than that in FIG. 2, so that the intensity of light is weakened while it is reciprocally transmitted through the second transparent sheet 2, the upper polarizing plate 6 and the upper glass plate 4 and the spot distribution can be substantially neglected since the transmittance is about 60 to 90%.

Figure 4:
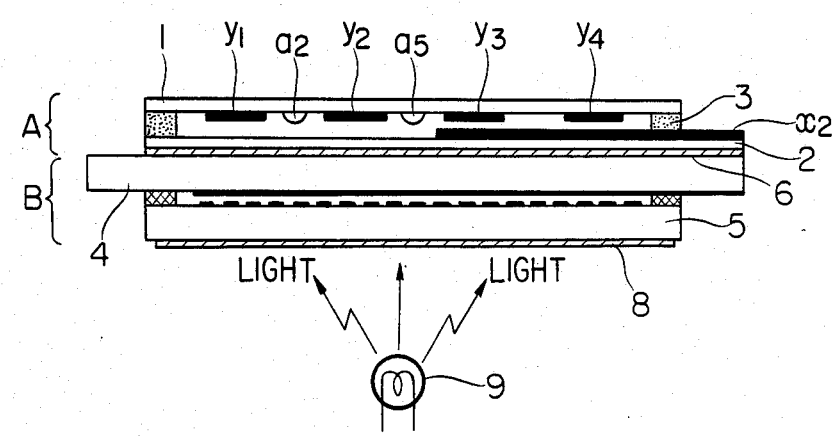
FIG. 4 is a sectional view of a liquid crystal display keyboard when a transmissive type liquid crystal display is used as the display unit B.

FIG. 4 is a sectional view of a liquid crystal display keyboard when a transmissive type liquid crystal display is used as the display unit B. Referring to FIG. 4, a lower polarizing plate 8 is formed on the lower surface of a lower glass plate 5. A transmitting light lamp 9 is arranged below the lower polarizing plate 8. The same reference numerals in FIG. 4 denote the same parts as in FIG. 1. The lamp 9 emits light, and the light is transmitted through the liquid crystal display so as to allow the operator to visually read the displayed content. Dot spacers $a_1$ to $a_9$ are formed on the lower surface (inner wall) of the first transparent sheet 1 which is further away from the light incident side than the upper surface (inner wall) of the second transparent sheet 2, so that the convex surfaces of the dot spacers $a_1$ to $a_9$ are directed toward the light incident side, thereby decreasing the focusing effect of the dot spacers. Even if focusing is only slightly performed, the focused spots are formed above the first transparent sheet 1, and thus displayed letters A to P can be clearly observed.

Figure 5A:
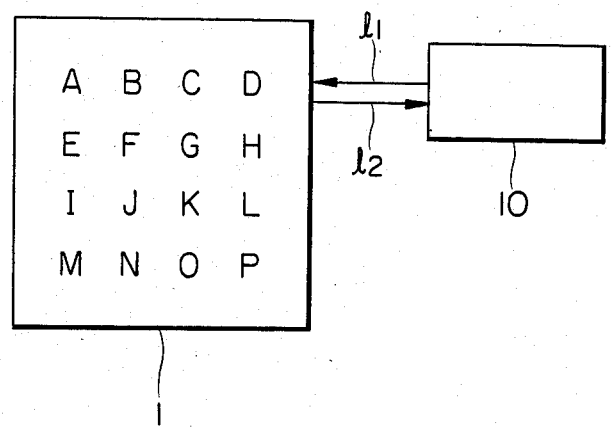
FIG. 5A is a representation showing a keyboard as a letter input device connected to an external circuit.

FIG. 5A shows an arrangement wherein the key input device according to the present invention is connected to an external circuit 10, a letter display signal is received by the key input device through a signal line $l_1$ and a key output signal is supplied to the external circuit 10 through a signal line $l_2$.

Figure 5B:
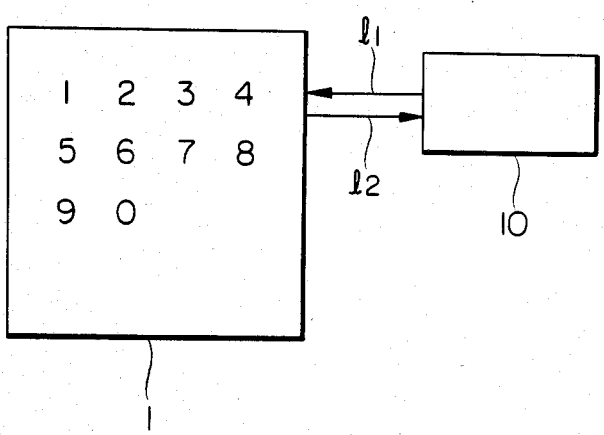
FIG. 5B is a representation showing a keyboard as a numeral input device connected to an external circuit.

FIG. 5B shows an arrangement wherein the key input device according to the present invention is connected to an external circuit 10, a numeral display signal is received by the key input device through a signal line $l_1$ and a key output signal is supplied to the external circuit 10 through a signal line $l_2$.

According to the present invention as described above, a plurality of dot spacers are formed between the two transparent sheets constituting the keyboard, so that the display data displayed on the display unit can be clearly observed through the keyboard. By properly determining which one of the transparent sheets has dot spacers, the displayed data can be more clearly observed on the display unit.

What I claim is:

1. A key input device comprising:
   a first plate member having an inner and an outer wall, said first plate member made of a transparent member having an electrical insulation property;
   first electrode means made of a conductor and formed on said inner wall of said first plate member;
   a second plate member having an inner and an outer wall and being oriented substantially parallel to said first plate member so as to sandwich said first electrode means, said second plate member being made of a transparent member having an electrical insulation property, said outer wall defining a light incident side;
   second electrode means made of a conductor and formed on said inner wall of said second plate member, each said inner wall of said plate members facing each other; and
   a focusing means provided by a projecting member made of a transparent member, said projecting member being formed on one of said inner walls, said inner wall being on the plate member not including the light incident side.

2. A device according to claim 1, wherein said projecting member comprises a plurality of semispherical elements.

3. A device according to claim 1 or 2, further comprising means for displaying information from said outer wall of said second plate member whereby information if communicated to said outer wall of said first plate member.

4. A key input device comprising:
   plate members comprising two electrically insulating transparent members spaced by a predetermined distance apart from each other, each plate member defining an inner and an outer wall, each said inner wall of each said plate members facing each other, one of said outer walls defining a light incident side;
   a plurality of transparent switching means arranged on said inner walls;
   means for displaying information from an outer wall of one of said plate members whereby information in communicated to said outer wall of the other of said plate members; and
   a focusing means provided by a projecting member made of a transparent member, said projecting member being formed on one of said inner walls, said inner wall being on the plate member not including the outer wall defining said light incident side.

5. A device according to claim 4, wherein said projecting member is formed on said inner wall of said plate member including the displaying means when said displaying means comprises a reflective type liquid crystal display.

6. A device according to claim 4, wherein said projecting member is formed on said inner wall of said plate member not including the displaying means when said displaying means comprises a light transmissive type liquid crystal display.

7. A key input device comprising:
   plate members comprising two electrically insulating transparent members spaced by a predetermined distance apart from each other, each plate member defining an inner and and outer wall, each said inner wall of each said plate members facing each other, one of said outer walls defining a light incident side;
   a plurality of transparent switching means arranged on said inner walls; and a focusing means provided by projecting members made of transparent member, said projecting members being formed between said insulating transparent members and being dispersed.

8. A device according to claim 7, wherein said projecting members comprise a plurality of semispherical elements.

9. A device according to claim 8, wherein said semispherical elements are integrally formed on one of said inner walls, said inner wall being on the plate member not including the outer wall defining said light incident side.

10. A device according to claim 9, wherein said semispherical elements are projected in the direction of said light incident side.

11. A device according to claim 7, further comprising means for displaying information from said outer wall of one of said plate members whereby information is communicated to said outer wall of said another plate member.

12. A device according to claim 8, further comprising means for displaying information from said outer wall of one of said plate members whereby information is communicated to said outer wall of said another plate member.

13. A device according to claim 9, further comprising means for displaying information from said outer wall of one of said plate members whereby information is communicated to said outer wall of said another plate member.

14. A device according to claim 10, further comprising means for displaying information from said outer wall of one of said plate members whereby information is communicated to said outer wall of said another plate member.

* * * * *